No. 857,676.  
PATENTED JUNE 25, 1907.  
C. S. ROGERS.  
COFFEE MAKING DEVICE.  
APPLICATION FILED AUG. 2, 1906.

ATTEST.  
H. J. Fletcher.  
M. P. Smith.

INVENTOR.  
CHARLES S. ROGERS.  
By Higdon & Longan  
ATT'YS.

UNITED STATES PATENT OFFICE.

CHARLES S. ROGERS, OF HOT SPRINGS, ARKANSAS.

COFFEE-MAKING DEVICE.

No. 857,676.

Specification of Letters Patent.

Patented June 25, 1907.

Application filed August 2, 1906. Serial No. 328,944.

*To all whom it may concern:*

Be it known that I, CHARLES S. ROGERS, a citizen of the United States, and a resident of Hot Springs, Garland county, Arkansas, have invented certain new and useful Improvements in Coffee-Making Devices, of which the following is a specification containing a full, clear, and exact description, reference being had to the accompanying drawings, forming a part hereof.

My invention relates to improvements in coffee making devices, and consists in certain novel features of construction and arrangement of parts, which will be hereinafter more fully set forth, pointed out in the claims, and illustrated in the accompanying drawings, in which:—

Figure 1:
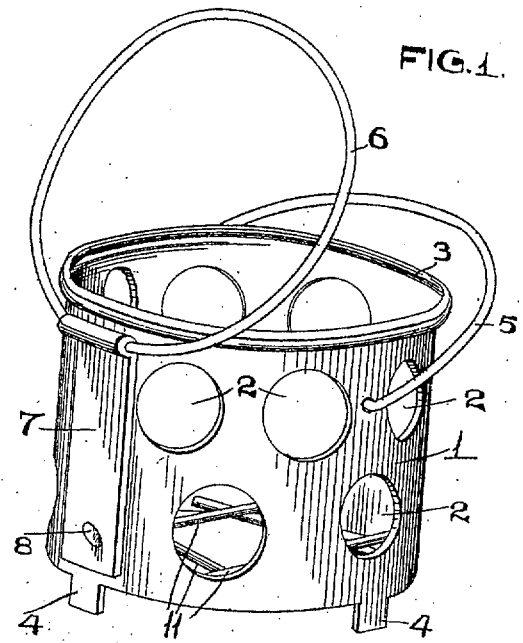
Figure 2:
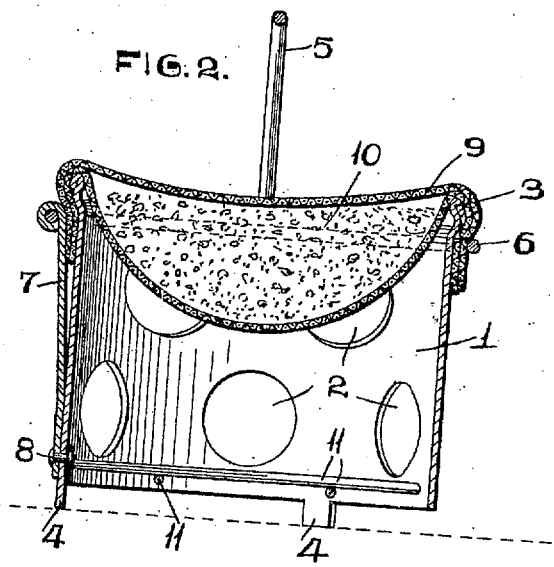

Figure 1 is a perspective view of my invention; and Fig. 2 is a vertical mid-section.

The object of my invention is to construct a device to be used in making coffee, which device may be used in connection with an ordinary coffee pot, or any vessel adapted to contain water.

The device is so constructed that the ground coffee is completely covered or incased in the cloth, whereby the boiling of the water incident to the making of coffee will not displace the coffee contained in the cloth and cause the grounds to be mixed with the coffee.

Furthermore, in the making of coffee with my improved device, I can make use of any ordinary piece of cloth, or wire fabric, in the employment of which it is only necessary to fold the same; that is to say, it is not necessary to make a specially constructed bag, or pocket, for the purpose of holding the coffee.

Referring to the drawings:—1 indicates a metallic casing, preferably cylindrical in form, provided with an open top, and with a substantially open bottom.

The casing is preferably stamped out of sheet metal, or it may be made out of reticulated wire fabric.

2 indicates a series of openings formed in the casing which is designed for the free passage and circulation of the liquid. Should this casing be made out of woven wire fabric, the interstices of said fabric will suffice to permit of the free circulation of the liquid without the formation of any openings, as shown in the drawing. Formed around the upper edge of said casing is an externally projecting rib 3, and carried by the lower end, or the bottom, of the same are a series of legs 4.

5 indicates a handle, which is pivotally secured to the casing, and which is used for suspending the device, when not in use, on a nail, or any other kind of support, and also for inserting and removing the device into and out of the coffee pot, or other receptacle.

6 indicates a cloth retaining ring, or band. Said ring, or band, is pivotally secured to a resilient plate 7, the lower end of which is secured to the casing 1 by means of a rivet 8; or, it may be secured in any other suitable mechanical manner. The upper free end of the plate 7 is unsecured to said casing, so that this portion may be sprung outwardly.

9 indicates the cloth, by means of which the ground coffee 10 is supported by the casing 1. In place of using a piece of cloth for this purpose, 1 may make use of finely woven screen wire. In applying this cloth, or wire, to the casing, I first fold the same, and insert a part of the folded portion down between the casing 1 and the upper end of the resilient plate 7, and the resiliency of said plate will hold or grip this portion of the folded fabric. I then turn back the upper portion of the fabric, and support the same by the wire 6, it being assumed that in this part of the operation that said wire occupies a substantially vertical position. The other portion of the folded fabric is laid across the open mouth of the casing 1. I then pour the ground coffee onto that portion of the fabric which is placed over the top of the casing 1, and I then lower the retaining ring 6, with the portion of cloth supported by it, until it springs down over the rib 3. When I have done this, the coffee is completely incased in the fabric, and suspended on the interior of the casing 1. I then elevate the handle 5, as illustrated in Fig. 2, and the device is ready to be inserted into the coffee pot, or any other suitable receiving receptacle.

The casing 1 is provided with a series of cross wires 11, which form a reticulated open bottom for the casing, the same being removed a short distance from the bottom of the casing. The function of this open bottom is to prevent the fabric containing the coffee, and consequently the coffee, from coming in contact with the bottom of the coffee pot, should it be pushed down too far, or accidentally dislocated.

It will be observed that the handle 5 is of a sufficient size to pass over the retaining band 6 when the same is pushed down to hold the fabric.

As heretofore stated, it is not necessary to use a specially constructed bag for holding the ground coffee in my device.

I employ any suitable piece of fabric, rectangular in form, which, after being used for making coffee, may be readily cleaned.

Heretofore, in coffee making devices, it has been necessary to have a specially constructed, open mouthed bag, in which the ground coffee was placed, these bags generally being stitched onto a wire rim. These bags being made in a pocket form, and specially made, are hard to clean and keep in a sanitary condition.

It is obvious that my device may be used for making tea, and for cooking various kinds of cereals.

I claim:—

1. The herein described device for making coffee, consisting of a perforated casing adapted to be inserted into a cooking utensil, a sheet of foldable fabric adapted to contain the coffee, and a band pivoted below the top edge of said casing and on the exterior thereof, adapted to be located around and removed from the top portion of the same for retaining and releasing the fabric; substantially as specified.

2. The herein described device for making coffee, consisting of a perforated casing adapted to be inserted into a cooking utensil, a sheet of foldable fabric adapted to contain the coffee, a band pivoted below the top edge of said casing and on the exterior thereof, adapted to be located around and removed from the top portion of the same for retaining and releasing the fabric, and a handle pivoted to said casing; substantially as specified.

3. The herein described device for making coffee, comprising a perforated casing, a fabric for holding the coffee, a resilient plate secured to said casing, and a retaining band carried by said plate and adapted to pass over the top portion of said casing for retaining the fabric; substantially as specified.

4. The herein described device for making coffee, comprising a perforated casing, a fabric for holding the coffee, a resilient plate secured to said casing, a retaining band carried by said plate and adapted to pass over the top portion of said casing for retaining the fabric, and a reticulated bottom for said casing; substantially as specified.

5. The herein described device for making coffee, comprising a casing, a foldable fabric adapted to be superimposed on the top edge of said casing, a bearing carried by said casing, and a retaining band carried by said bearing and adapted to pass over the top edge of said casing for retaining the fabric and uniting the flaps thereof, thereby converting the same into a closed bag; substantially as specified.

6. The herein described device for making coffee, consisting of a perforated casing adapted to be inserted into a cooking utensil, a rib formed around the top edge of said casing, a sheet of foldable fabric adapted to contain the coffee, and a band pivoted below the top edge of said casing and on the exterior thereof, adapted to be located around and removed from the top portion of the same for retaining and releasing the fabric; substantially as specified.

In testimony whereof, I have signed my name to this specification, in presence of two subscribing witnesses.

CHARLES S. ROGERS.

Witnesses:
M. P. SMITH,
E. E. LONGAN.